United States Patent [19]
Tacke et al.

[11] 3,831,330
[45] Aug. 27, 1974

[54] PANEL SYSTEM

[75] Inventors: William H. Tacke, Wyoming; Robert B. Ormiston, Grandville; Robert H. McKay, Grand Rapids, all of Mich.

[73] Assignee: Steelcase Inc., Grand Rapids, Mich.

[22] Filed: July 9, 1973

[21] Appl. No.: 377,273

Related U.S. Application Data

[62] Division of Ser. No. 234,492, March 14, 1972, Pat. No. 3,802,146.

[52] U.S. Cl. .................................. 52/220, 52/290
[51] Int. Cl. ............................................. E04c 2/52
[58] Field of Search ....... 52/98, 220, 221, 238, 239, 52/241, 287, 288, 290, 716, 122

[56] References Cited
UNITED STATES PATENTS

| | | | |
|---|---|---|---|
| 3,034,609 | 5/1962 | Young | 52/220 X |
| 3,289,368 | 12/1968 | Mark | 52/220 |
| 3,321,878 | 5/1967 | Brown et al. | 52/220 |
| 3,377,756 | 4/1968 | Polhamus | 52/220 |
| 3,529,389 | 9/1970 | Wilkins | 52/221 X |

*Primary Examiner*—Price C. Faw, Jr.
*Attorney, Agent, or Firm*—Price, Heneveld, Huizenga & Cooper

[57] ABSTRACT

A partition system including a frame to which different types of covering panels can be readily hooked into place. Vertical wiring channels are provided at the end elements of the frame and covers are provided which simultaneously cover the wiring channels and mask the edges of the panel. Brackets for supporting superstructure can be secured to the end elements of the frame in channels which are defined by an end trim piece on one side and by a wall of the wiring channel on the other side. Adjacent partitions can be secured together angularly by means of a single link at the top and a single link at the bottom thereof. They can be secured in alignment by a pair of adjacent links at the top and at the bottom. Vertically spaced platforms can be mounted on feet at the bottom of the partitions to define space wiring channels. Telescoping end caps are provided for covering the ends of the wiring channels and the top portion of each end cap can be telescoped downwardly to allow access to the connecting links at the bottom of the partition. The wiring channels can be covered on either side by a molding which is releasably securable to the bottom of the partitions. In the case of wiring which must pass from one partition to another where the partitions are to be disposed at an angle, a telescoping corner cap is provided. Finally, special connector brackets are provided for connecting partitions of different heights to one another at various angles.

11 Claims, 22 Drawing Figures

PATENTED AUG 27 1974 3,831,330

PANEL SYSTEM

CROSS REFERENCE TO RELATED APPLICATION

This is a divisional application of parent application Ser. No. 234,492, filed Mar. 14, 1972, now U.S. Pat. No. 3,802,146 and entitled PANEL SYSTEM.

BACKGROUND OF THE INVENTION

The present invention relates to movable partition systems. Such systems provide versatility in office arrangements and decrease overhead by eliminating the need to erect permanent partitions.

However, such partition systems are still extremely expensive. One factor which contributes to this expense is the need for versatility of styling. In order to provide versatility of styling, manufacturers construct a basic partition having one type of exterior surface and merely secure additional surface materials, such as tack board or the like, thereto. In the alternative, completely different partitions are constructed for different colors, styles and the like. Unfortunately the consumers who purchase the latter type partitions are locked in on one type of styling for the life of the partitions.

Some semipermanent wall systems, as opposed to the readily movable partition systems to which the present invention is directed, include frames erected from floor to ceiling and with panels secured to the frames. These systems could not be used in movable partition systems because the rather ineffective panel securing means which are typically employed would allow the panels to fall off when the partitions are moved. Further, the securing means utilized in these systems allow the panels to bow outwardly away from the frames, thereby creating an undesirable, cheap appearance.

Another factor contributing to the expense of prior art movable partition systems are the complicated interconnecting mechanisms which are employed for joining adjacent partitions. Such mechanisms additionally contribute to a lack of versatility in the system. One prior art system uses a single joining tab between adjacent connected partitions, but this system suffers from wobbling of one partition with respect to another when the two partitions are placed in direct alignment.

While some prior art partition systems have concealed wiring areas at the base of the partitions, none of the systems offer any flexibility in vertical wiring. There may be vertical wiring channels in some of the systems, but they are either completely open and exposed, or in the alternative are completely closed and offer no way of leading wiring out of the channel where desired.

Even in systems having base wiring areas, the wiring areas are frequently inadequate for required usage. Most state and local laws require that casual wiring and telephone wiring be stored in a separate compartment from permanent wiring. Some partition systems do employ two separate channels in the base wiring area. However, these separate channels are permanent and thereby create additional expense for the purchaser who does not intend to place any wiring in the base. In the alternative, only one channel wiring area is provided and the use of permanent lines in conjunction with casual wiring requires the user to improvise a makeshift divider of some type.

The base wiring areas generate yet another source of expense in that elaborate moldings or covers are required to cover these areas. These moldings must be readily removable. When service lines or casual wiring is passed between two partitions cocked at an angle, the moldings or covers do not extend beyond the ends of the partitions and the wiring is left exposed.

Also expensive are the stabilizers which are employed when a single partition or a plurality of partitions in direct alignment must be stabilized. Prior art systems employ complicated stabilizer structures which include integral leveler glides at the ends thereof. Thus, the systems employ a leveler on the partition for use without a stabilizer in addition to a leveler on the stabilizer itself.

Finally, prior art systems lack versatility in joining partitions of different height, or in joining partitions to adjacent cabinets or the like. The concept employed in the present invention obviate or minimize all of the above as well as other drawbacks in prior art partition systems.

SUMMARY OF THE INVENTION

The present invention provides versatility of partition styling in an economical manner by providing a frame to which any number of different types and styles of panels can be readily secured. The frame includes top and bottom elements joined by vertical end elements and a crosspiece, the latter being positioned intermediate the top and bottom elements. Each removable panel includes means generally at the center thereof on its inside face for cooperating with the crosspiece to hold the center of the panel in place. Preferably, means are provided at the top, bottom and end elements for masking the edges of the panel.

Stability and simplicity are the keynotes of the manner in which adjacent partitions are joined together. A pair of links are secured to the top end of each of a pair of adjacent partitions. The links are disposed adjacent one another, but are spaced towards opposite sides of the partitions. At least one of the links is pivotally secured at one end to one of the partitions and the other of the links is removable. Thus when the partitions are joined in direct alignment, the two links provide lateral stability and prevent wobbling. When an angular relationship is desired, the removable link can be removed and one of the partitions pivoted about its pivotal connection to the link.

Preferably, each of the links joining the top ends of the partitions includes first and second legs disposed generally at an obtuse angle with respect to one another. The first leg is secured at one end to the top of one partition and is joined to the other partition generally at the juncture of the first and second legs. The second partition is again joined to the second leg generally at the end thereof. This triple connection of the link further lends to lateral stability of the system.

Versatility in vertical wiring is achieved by providing an outwardly opening vertical channel into which wire can be stored. A cover is secured to the channel to completely cover it, but the cover includes a face which is constructed of material sufficiently soft and thin that it can readily be cut to facilitate passage of wire or the like through the cover. Preferably, the cover includes a pair of fingers projecting rearwardly from its face for embracing opposite sides of one sidewall of the channel. The face itself then projects from these fingers and is generally planar in configuration whereby it can readily be cut in alignment with the channel opening.

In another aspect of the invention, the cover for the wiring channel simultaneously provides a means for masking the side edges of the detachable panels. Thus, the face projects not only over the wiring channel, but also projects in a direction towards the detachable panels to thereby mask the edges thereof. This further increases the utilization of the vertical end frame elements to which the wiring channels are preferably secured.

Maximum utilization of the vertical end elements of the frame is further facilitated by providing a pair of adjacent channels at the ends of the partitions as part of the end elements. The first channel is for wiring and the second includes means for cooperating with brackets whereby superstructure can be mounted to the partition. Preferably, the vertical frame element itself comprises opposed sidewalls and an end wall with an end trim piece secured over the end wall and defining a pair of first walls extending away from the sidewalls. These first walls, combined with one of the wiring channel walls, define the bracket mounting channel. Preferably, this channel is quite narrow and includes slots at the base thereof into which the superstructure mounting brackets can be secured. To prevent light from passing through the slots from one sidewall of the vertical frame element to the other, a blind is secured to the inside of the frame element and passes between the opposed slots.

In the base wiring area, the dual channel wiring problem is solved by providing a foot at each end of the frame, the foot having a top wall, sidewalls and a bottom wall and being open through its center in a direction generally parallel to the plane of the partition. The vertical end element of the partition frame extends below the level of the bottom frame element and is secured to the top wall of the foot. The top wall of each foot includes means for securing a first platform thereto to define a wiring channel between the first platform and the bottom frame element. The bottom wall of each foot includes means for securing a second platform thereto for defining a second wiring channel between the first and second platforms and through the openings in the feet.

The base wiring area is covered on either side by a simplified molding which cooperates with a tab projecting outwardly from each side of each foot. The tab is resiliently flexible downwardly. The molding includes a top edge which abuts the underside of the panels and a bottom edge which includes recesses therein for matingly engaging the tabs.

In another aspect of the invention, an end cap member is provided, for covering the ends of the base wiring area, which includes first and second telescopically interfitting members. The first member is positioned generally adjacent the bottom of the partition and is slidable downward onto the second member in order to allow access to the partition joining means which are positioned generally in line with the bottom edges of the panels. Preferably, both of the telescopically interfitting members include knockouts whereby electrical wiring can be passed therethrough from one panel to another if desired.

To facilitate covering of wiring passing between adjacent partitions which are cocked at an angle, a special corner member is provided which comprises telescopically interfitting first and second members. The first member is secured to the bottom, generally outside edge of one partition and the second is secured to the bottom generally outside edge of the other. Each of the first and second members includes a curved sidewall and a top wall which is shaped generally like a segment of a circle. These first and second members are then telescopically interfitted whereby the angle between adjacent partitions can be varied.

Stabilization is simplified and economized by providing each of the feet at the base and end of the partition with a leveler and by providing a stabilizer which is mounted to the foot in slidable vertical relationship with respect thereto. Securing means are provided for tightening the stabilizer with respect to the foot such that the leveler glide can be used to adjust the height of the partition with the stabilizer loose and free to slide, and the stabilizer can then be tightened with the securing means.

Finally, it is an object of the present invention to provide a plurality of related joining brackets to facilitate joining partitions of different heights and to facilitate joining partitions to cabinets or the like. Generally, these brackets are characterized in that they include one leg for cooperating with the channel which is normally used to secure superstructure to the partition and a second leg which includes means for joining it to that portion of the panel which is normally used to join adjacent partitions in endwise relationship. Another innovation involves the use of a wing bolt which can be threaded into the side of a cabinet or the like and which includes means on the wing thereof for securing to the top end of an adjacent partition.

These and other objects and advantages of the invention will be more fully understood and appreciated by reference to the written specification and appended drawings.

BRIEF DESCRIPTION OF THE DRAWINGS

FIG. 18 is a slightly elevated perspective view of a corner cover for adjacent partitions;

FIG. 22 is a plan view of two alternative wing bolts which can be used in this invention to join a partition to a cabinet or the like.

PREFERRED EMBODIMENT

Figures 1, 2, 3, 4, 5:
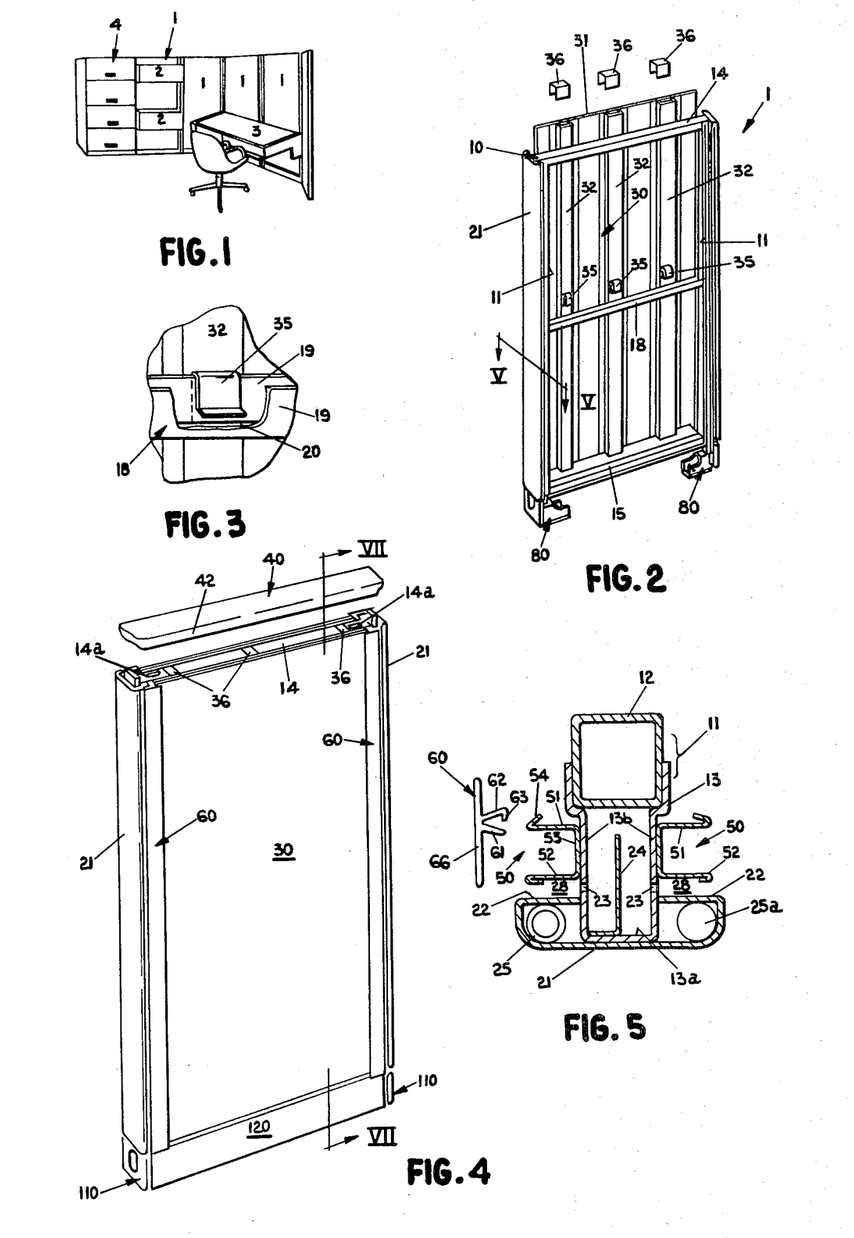
FIG. 1 is a perspective view of a typical arrangement of the partition system of the present invention.
FIG. 2 is an exploded perspective view showing the partition frame and a panel for securing thereto.
FIG. 3 is a broken, cutaway view of the central portion of the frame and panel shown in FIG. 2.
FIG. 4 is a perspective view of the assembled partition with the top trim piece exploded away.
FIG. 5 is a cross-sectional view taken along plane V—V of FIG. 2.

FIG. 1 shows a typical arrangement of the partition system in which partitions 1 are used to support files 2 and a work table 3. One end partition is shown joined to a filing cabinet 4. The partition 1 itself is the heart of this entire system.

Figure 14:
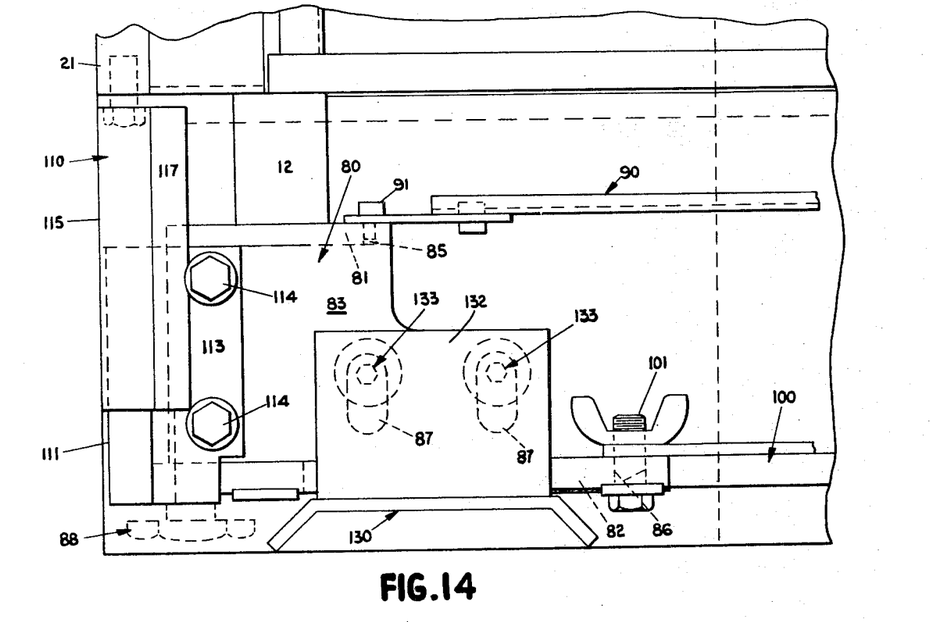
FIG. 14 is an elevational view of the lower lefthand portion of a partition with no molding secured thereto.
Figure 15:
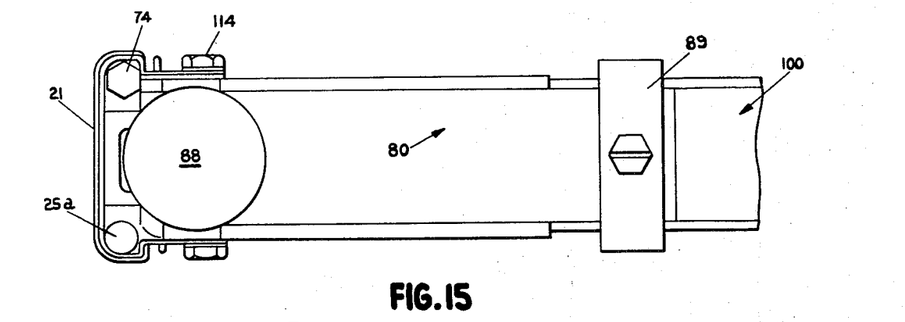
FIG. 15 is a bottom plan view of that portion of a partition shown in FIG. 14.

In the preferred embodiment, partition 1 consists of a frame 10 which can be covered by panels 30 hung on either side thereof (FIG. 2). A top trim piece 40 is secured to the top of frame 10 and masks the top edges of panel 30 (FIG. 4). The side edges of the panel 30 are masked by covers 60 which additionally cover a vertical wiring channel 50 at each end and on each side of the partition (FIGS. 4 and 5). At its base, each partition 1 is supported by a foot 80 at either end thereof (FIG. 2), each including a leveler glide 88 (FIG. 14). The area between feet 80 is a base wiring area in which various electrical wiring can be inserted. This area is hidden at its sides by detachable moldings 120 (FIGS. 4 and 7) and by end covers 110 (FIG. 4).

Figure 7:
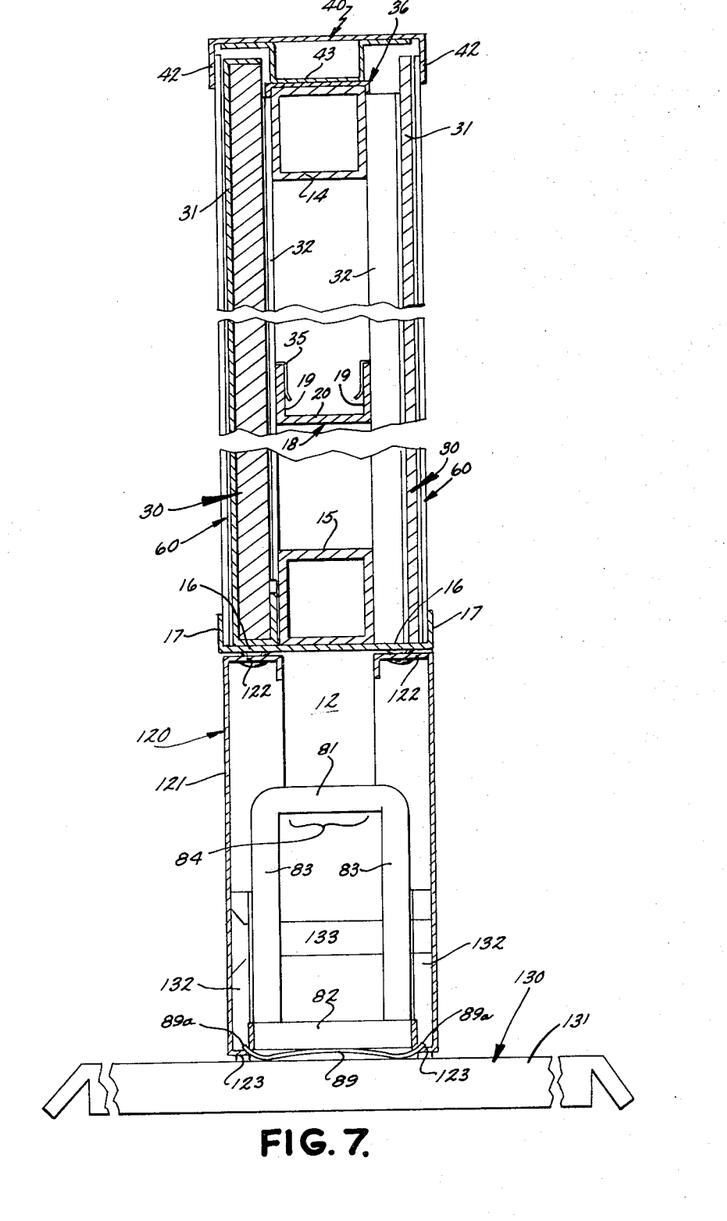
FIG. 7 is a cross-sectional view taken along plane VII—VII of FIG. 4.
Figures 8, 9, 10:
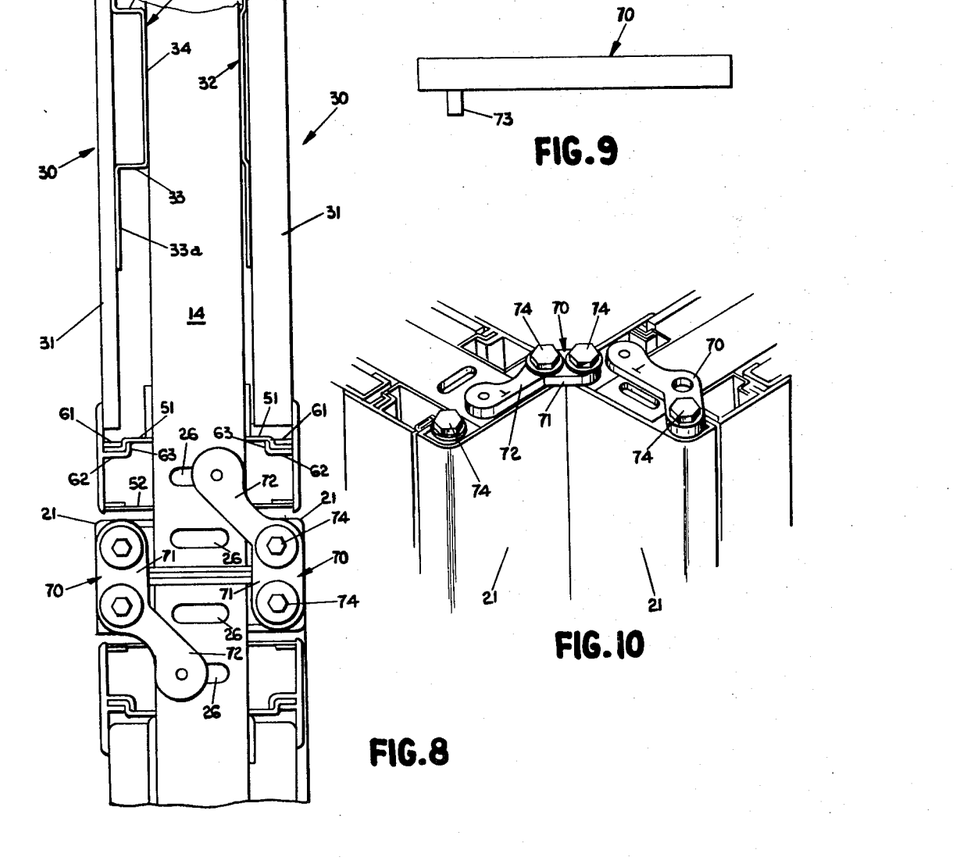
FIG. 8 is a top plan view of a pair of adjacent partitions joined together.
FIG. 9 is a side elevational view of a link for joining adjacent partitions together.
FIG. 10 is a generally elevated perspective view of the corner portions of a pair of partitions joined together and cocked at an angle.

Adjacent partitions can be joined together by means of adjacent links 70 (FIG. 8). If desired, one of the links 70 can be removed and placed in a stored condition, leaving only one link joining the partitions and allowing the partitions to be arranged angularly with respect to one another (FIG. 10). If a single partition is to be free standing, or if a plurality of partitions are to be arranged in a line, a stabilizer 130 is slidably mounted to foot 80 (FIGS. 7 and 14). Proper height is set by leveler glide 88 and stabilizer 130 is then bolted tightly to foot 80 by bolts 133 (FIG. 14).

Figures 18, 22:
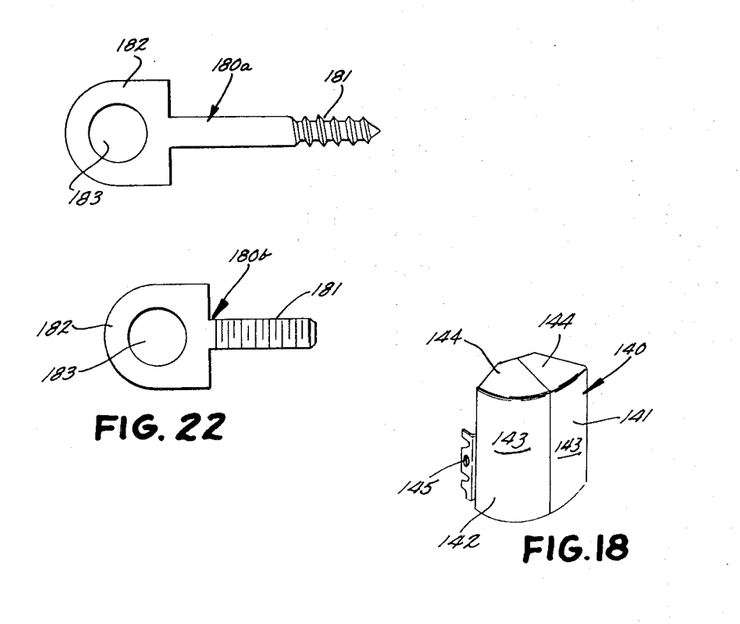
Figure 19:
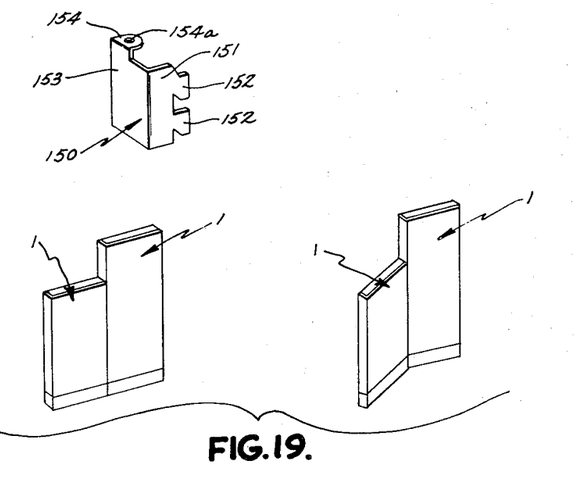
FIG. 19 is a perspective view showing a partition joining bracket and showing the manner in which partitions can be joined using this bracket.
Figure 20:
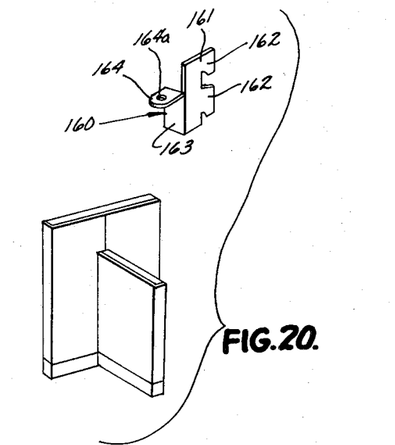
FIG. 20 is a perspective view of another partition joining bracket and showing the manner in which partitions can be joined using this bracket.
Figure 21:
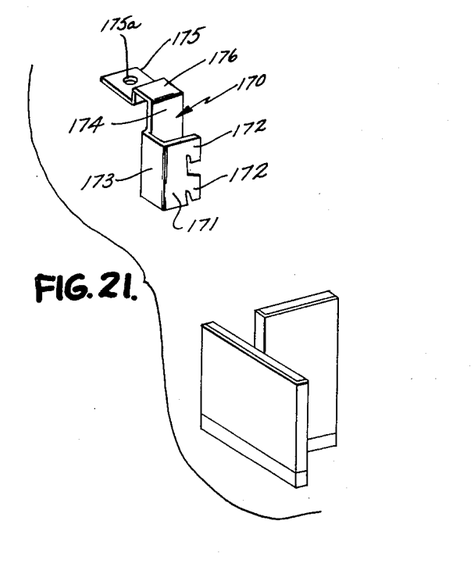
FIG. 21 is a perspective view of still another partition joining bracket and a showing of the manner in which partitions can be joined using this bracket.

When partitions are to be joined at an angle with electrical wiring passing therebetween, a special corner cover 140 hides the wiring (FIG. 18). To facilitate joining a taller to a shorter panel in either aligned or slightly angled fashion, a joining bracket 150 is provided (FIG. 19). For joining such panels perpendicularly, a perpendicular joining bracket 160 is provided (FIG. 20). For joining a taller panel to a shorter panel midway of the shorter panel, a midway bracket 170 is provided (FIG. 21). Finally, to join a partition to a cabinet or the like, a wing bolt 180a or 180b can be utilized (FIG. 22).

Frame 10 includes a pair of vertical end elements 11 joined by top element 14, bottom element 15 and crosspiece 18 positioned generally centrally between top element 14 and bottom element 15 (FIG. 2). Each of these elements is formed of tubular stock, formed sheet metal or the like. Each end element 11 comprises a tubular post 12 with a generally Cshaped extension 3 welded thereto (FIG. 5). Extension 13 includes an end wall 13a and a pair of sidewalls 13b, the latter being welded at their ends to post 12. Top element 14 is generally tubular in configuration, and includes apertures 14a therein for matingly receiving top trim piece 40 (FIG. 4). It is welded at its ends to post 12 of end element 11. Bottom element 15 also comprises a generally tubular post (FIG. 7). A channel-shaped member is welded to the bottom of bottom element 15 to define a ledge 16 having an upturned lip 17 projecting laterally from either side of bottom element 15. Panels 30 are received in the channels formed by ledge 16, lip 17 and bottom element 15.

Crosspiece 18 is generally channel-shaped (FIGS. 3 and 7) including sidewalls 19 and a base 20. The channel sidewalls 19 provide means for cooperating with connecting means on panels 30.

Secured to the end of end element 11 is an end trim piece 21 (FIGS. 2, 4 and 5). End trim piece 21 is secured by tack welding or the like to end wall 13a of end element 11 and wraps around to jut back inwardly to join sidewalls 13b and define channel walls 22 extending laterally from sidewalls 13b (FIG. 5). These channel walls 22, along with the outside walls 52 of vertical wiring channels 50 cooperate to define a narrow, recessed channel 28 which includes means therein for securing brackets to partition 1. Superstructure such as work shelf 3, filing cabinets 2, etc., can be supported on partitions 1 by means of such brackets. Specifically, this securing means comprises slots 23 in sidewalls 13b at the base of channel 28. To prevent light from passing through the slots 23 from one sidewall 13b to the other, and to thereby minimize the visual noticeability of channel 28, a blind 24 is secured to the inside of end element 11, specifically to end wall 13a of extension 13, and projects into the space between the opposing slots 23.

Figure 11:
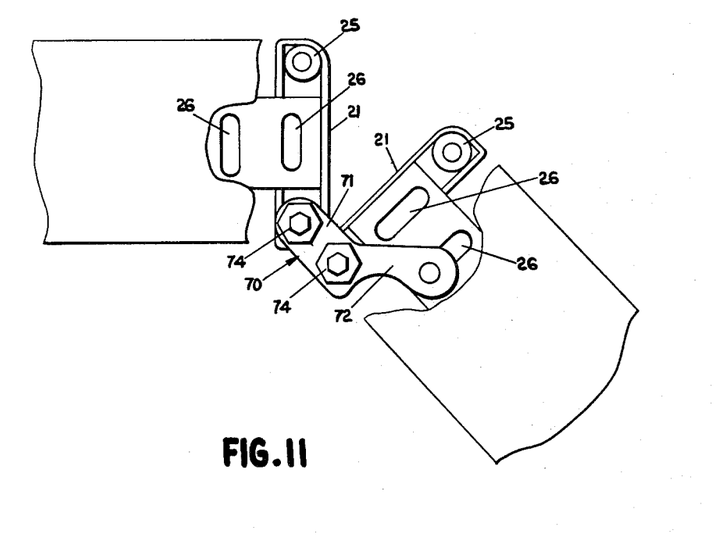
FIG. 11 is a top plan view of a pair of partitions joined together with the end portions of the top trim pieces broken away.
Figure 12:
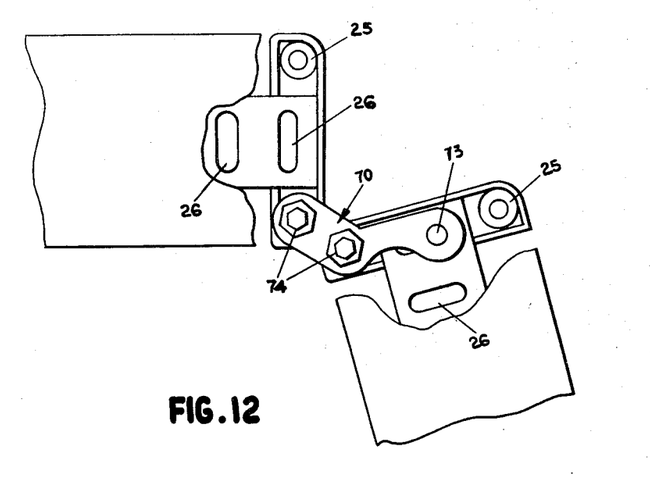
FIG. 12 is a top plan view of a pair of partitions joined together with the end portions of the top trim pieces broken away.
Figure 13:
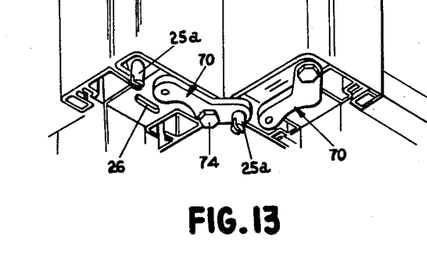
FIG. 13 is a bottom perspective view of the corner portions of a pair of adjacent partitions.

To facilitate the joining of adjacent partitions 1, end trim piece 21 also includes nuts 25 welded therein at each side of end element 11 (FIGS. 5, 11 and 12). It is into these nuts 25 which bolts 74 are threaded in order to secure links 70 to the partitions 1. One such nut 25 is also positioned at the bottom and one side of end trim piece 21 (FIGS. 5 and 13). However, the other side is equipped only with a downwardly projecting pin 25a which passes through a receiving aperture in a link 70. This modification is designed to ease the job of securing links 70 to the bottoms of the partitions. Also to facilitate securing links 70 to the partitions, each top element 14 and each bottom element 15 includes a pair of spaced apertures or slots 26 therein (FIGS. 8, 11 and 12). These cooperate with links 70 in a manner which will be more fully set forth hereinafter.

Panels 30 comprise a face or board 31 backed by several rigidifying studs 32 secured to the back side thereof (FIG. 2). Face 31 can be any one of a multitude of different types of board. For example, it might be tack board or cork board. It could simply be a sheet of hardboard or fiberboard. It could be an unholstery covered board. An infinite variety and styles of boards can be used for face member 31.

Rigidifying studs 32 are generally channel-shaped in configuration, having sidewalls 33 and a base wall 34 (FIGS. 2 and 8). Each of the sidewalls 33 includes a flange 33a projecting laterally therefrom for securance to the back of face member 31 by means of glue, screws, tack welding or the like. The combined thickness of channels 32 and face member 31 is always the same, regardless of what particular type of face member 31 is utilized. Thus, the thickness, or depth, of each rigidifying stud channel 32 is inversely proportional to the thickness of the face member 31 used. This is illustrated particularly in FIG. 8, where on the left-hand side, a thinner face member 31 is used, requiring thicker studs 32 and on the right, a thicker face member 31 is used, requiring thinner studs 32. Preferably, the overall thickness of each panel 30 is such that the front or outside surface of face 31 is approximately flush with the lateral extremities of end trim piece 21 (FIG. 8).

Each panel 30 is secured to frame 10 by means of a plurality of hooks 35, each of which is secured to the base wall 34 of a rigidifying stud 32 (FIGS. 2, 3 and 7). The hooks 35 are located generally centrally of panel 30 such that when they are hooked over the wall 19 of crosspiece 18, they positively hold the center area of the panel 30 tightly against frame 10. This prevents the occurrence of undesirable bowing.

Panels 30 are not only hooked over crosspiece 18, but also they are inserted into the channel defined by ledge 16 and lip 17 (FIG. 7). Lip 17 thereby acts as a means for masking the bottom edge of panel 30 and aids in holding panel 30 tightly against frame 10. At the top of panel 30, a plurality of generally U-shaped clips 36 are provided to aid in holding the tops of panels 30 tightly against top piece 14 (FIGS. 2, 4 and 7). One leg of each clip 36 hooks into the top of the channel-shaped stud 32 on one side of crosspiece 14, and the other leg similarly hooks into the channel-shaped stud 32 on the panel 30 at the opposite side of top piece 14. Each clip 36 then sets down on top of crosspiece 14 in the manner shown in FIG. 4.

Figure 6:
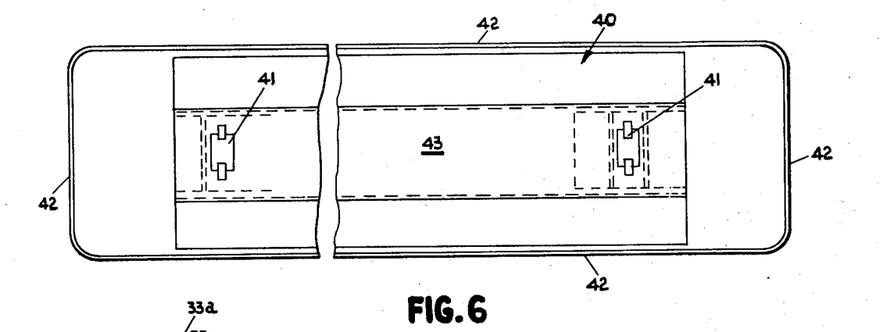
FIG. 6 is a bottom plan view of the top trim piece.

Top trim piece 40 includes securing clips 41 projecting downwardly from the bottom thereof (FIG. 6) which can be inserted into apertures 14a in top frame element 14 (FIG. 4). Top piece 40 includes a peripheral lip 42 projecting downwardly therefrom which slips down over the top edges of panels 30 and thereby acts to mask those top edges (FIGS. 4, 6 and 7). A downwardly projecting center piece 43 sets snugly atop top frame element 14 when top trim piece 40 is in place (FIGS. 6 and 7).

Secured to each vertical end element 11 on either side thereof is a generally channel-shaped member defining a vertical wiring channel 50 (FIG. 5). Vertical wiring channel 50 includes an inside wall 51 spaced inwardly away from end trim piece 21, an outside wall 52, spaced towards end trim piece 21, and a joining base 53. This member is formed of metal or the like and is secured to the sidewalls 13b of extension 13 by means of tack welding or the like. The edges of each of the walls 51 and 52 are folded over to define a smooth exterior edge. However, inside wall 51 is folded over only partially, to leave a lip 54 extending the length thereof. Lip 54 cooperates with the securing means of cover 60 to secure cover 60 to channel 50.

Cover 60 is a plastic extrusion which comprises a face 66 with a pair of fingers projecting rearwardly therefrom (FIG. 5). These include an inside finger 61 which goes to the inside of channel 50 and an outside finger 62 which goes to the outside thereof. Outside finger 62 includes a hook 63 thereon which slips over lip 54 and thereby holds cover 60 in place. Preferably, fingers 61 and 62 diverge to define generally a V, with hook 63 hooking back towards finger 61 (FIG. 5). This makes it easier to slip these fingers over channel wall 51. Preferably, lip 54 is an outward and rearward bend. However, FIG. 8 does show an acceptable alternative.

Face 66 extends laterally away from fingers 61 and 62 in the direction of outside channel wall 52. This portion of face 66 completely covers channel 50 and hides any wiring that is inserted therein from view. It is important that this portion of face 66 be generally planar in configuration such that it can easily be cut or notched inwardly from the side edge thereof in the manner shown in FIG. 16. In the right side view of FIG. 16, face 66 includes a hole 64 punched therein and a cut 64a cut inwardly from the side edge. This effects an opening through cover 60 into wiring channel 50 and allows a wire to be passed out through hole 64. In the alternative, a notch 65 could simply be cut in from this edge of cover 60.

Face 66 also extends laterally from fingers 61 and 62 in the opposite direction. This portion of face 66 overlaps and masks the side edge of panel 30 such that the side edges thereof are not visible (see FIGS. 4 and 5).

The links 70 which are used to join adjacent partitions together are generally flat pieces of steel having a pin 73 projecting downwardly from one end thereof (FIG. 9). Specifically, each link 70 includes a joining leg 71, which is the primary connection between adjacent partitions and a rigidifying leg 72 (FIGS. 8 & 10). At the top of adjacent partitions, joining leg 71 is joined at one end to one of the partitions by means of a bolt 74. Each link 70 is joined to the other partition generally at the juncture of joining leg 71 and rigidifying leg 72 by a second bolt 74. Rigidifying leg 72 is secured at its end to the same partition by means of downwardly projecting pin 73 engaging one of the apertures or slots 26 in top frame member 14. One link 70 is secured to one side of the adjoining partitions and one is secured to the other. This provides greater lateral stability than would be obtained through the use of only a single link 70. The fact that rigidifying leg 72 is also connected to one of the partitions further increases lateral stability. Rigidifying leg 72 is joined to joining leg 71 at an oblique angle, primarily so that it will deviate away from the face of the partition to a point above top element 14 into which a secure fastening can be maintained. Aperture 26 in frame element 14 is somewhat elongated in order to allow for variations in tolerance.

It will be noted that each top element 14 includes two spaced slots 26. This facilitates joining adjacent partitions 1 at a wider variety of angles. When partitions are joined in alignment, as shown in FIG. 8, the pin 73 of rigidifying leg 72 is positioned within the innermost of the two slots 26. In order to adjust the partitions angularly with respect to one another, one of the links 70 is removed, as shown in FIG. 11, and the partition which is secured to the end of joining leg 71 is rotated slightly. Due to the desirability of maintaining a close fit between the adjacent panels, however, a point is reached where the corners of the end trim pieces 21 begin to interfere. At this point, further angular adjustment from the position shown in FIG. 11 becomes somewhat more difficult. Accordingly, the joining link 70 can be removed and readjusted with pin 73 positioned within the endmost slot 26 in the manner shown in FIGS. 10 & 12. This enables the joined partitions to be disposed at a perfect right angle to one another (FIG. 10), or to be cocked slightly at an angle greater than 90°, but less than 135° (FIG. 12). When a link 70 is not being used, the end of joining leg 71 is bolted to one partition and link 70 is oriented with pin 73 projecting into the open end of wiring channel 50. Links 70 join partitions 1 at their bottom ends in substantially the same way. The only exception, as heretofore pointed out, is that a pin 25a (FIGS. 5 and 13) projects downwardly for projecting through that aperture at the end of joining leg 71 which would normally receive a joining bolt 74.

The entire frame 10 is supported by a pair of feet 80, one being positioned at the bottom and each end thereof (FIG. 2). Each foot 80 includes a top wall 81 a pair of spaced sidewalls 83 and a bottom wall 82 (FIG. 7). These define a large central opening 84 extending through foot 80, generally in a direction parallel to the plane of partition 1. Opening 84 serves to provide a wiring access opening into the base area of partition 1.

The post 12 of end frame element 11 extends downwardly below the level of bottom frame element 15 and is mounted by welding or the like to top wall 81 of foot 80 (FIGS. 7 and 14). Top wall 81 also includes an aperture 85 therein into which a bolt 91 can be threaded or might pass, for securance to a nut on the opposite side, to facilitate the mounting of a top platform 90 to top wall 81 (FIG. 14). Platform 90 is a divider made of sheet metal or the like which extends between the top walls 81 of the feet 80 at opposite ends of the partition. It provides a wiring channel between it and the bottom of bottom frame element 15. It is a readily attachable or detachable option to the system which is necessary if the base wiring area is to be divided into two separate channels, one for casual wiring and one for permanent wiring.

Bottom wall 82 includes a similar aperture 86 therein whereby a bottom platform 100 can be secured thereto by means of nut and bolt combinations 101 or the like (FIGS. 7 and 14). Bottom platform 100 aids in defining a wiring channel between itself and top platform 90, through the openings 84 in feet 80. Bottom platform 100 prevents any wiring in this channel area from being exposed below the level of molding 120 which is used to cover this base wiring area.

A leveler glide 88 is also secured to each foot 80, being threaded into the bottom wall 82 thereof (FIG. 14). By threading leveler glide 88 upwardly or downwardly, the level of the partition can be adjusted. Each foot 80 includes a pair of elongated vertical slots 87 in each sidewall 83 to facilitate the slidable joining of stabilizer 130 thereto in a manner which will be subsequently described.

Figure 17:
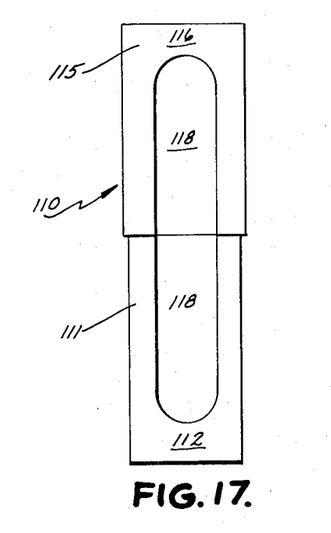
FIG. 17 is an end elevational view of the end cover for the base wiring area of a partition.

Each sidewall 83 includes a pair of threaded openings therein positioned in vertically adjacent relationship whereby bolts 114 can be threaded thereinto to secure end cover members 110 to feet 80 (FIG. 14). An end cover 110 is secured to each foot 80 at each end of the partition to provide a decorative cover therefor. Each end cover 110 comprises a pair of telescopically interfitting members, a bottom member 111 and a top member 115 (FIGS. 14 and 17). Bottom member 111 includes a front wall 112 and a pair of spaced sidewalls 113 which embrace the sidewalls 83 of foot 80. The bolts 114 pass through appropriate apertures in sidewalls 113 to secure bottom member 111 to foot 80. Top member 115 similarly includes a front wall 116 and sidewalls 117. The sidewalls 117 are somewhat shorter in distance from front wall 116 than are the sidewalls 113 from front wall 112 (FIG. 14). Sidewalls 117 are just long enough so that they fit under the edge of at least one of the bolts 114 whereby top member 115 can be securely fastened against slidable movement with respect to bottom member 111. However in order to facilitate access to the bottom of end trim piece 21, at which point joining links 70 are secured to the bottom of the partition, top member 115 can be loosened by loosening bolts 114 and can be slid telescopically downwardly onto bottom member 111.

To facilitate the passage of electrical wiring into the base wiring area of the partition, each of the bottom and top members 111 and 115 of end cover 110 includes a knockout portion 118 in the respective front face 112 or 116 thereof. In top member 115, knockout 118 defines a downwardly opening U-shaped slot and in bottom member 111, knockout 118 defines an upwardly opening U-shaped slot.

The entire base wiring area can be covered in the manner shown in FIG. 4 by bottom moldings 120. Each molding 120 is preferably formed of sheet metal or the like (FIG. 7) and includes a front wall 121 bent over and downwardly at its top to define a top edge 122. At its bottom, front wall 121 is bent over and upwardly to define a bottom edge 123. A spring tab member 89 is welded or otherwise secured to the bottom of foot 80 and its projecting ends define tabs 89a which are resiliently flexible in a downward direction. The bottom edges 123 of moldings 120 include apertures or slots therein for receiving these tabs 89a. Thus to secure a molding 120 to the base wiring area, the slots are matingly engaged with the resilient tabs 89a and the tabs 89a are forced downwardly so that the top edge 122 of each molding 120 can be snapped into position below ledge 16 of bottom frame element 15. In this manner, the entire bottom wiring area is readily coverable and is readily accessible when so desired.

Stabilizer 130, which is provided for supporting either a plurality of panels in a straight line or a single panel, comprises a base 131 formed of steel or the like and a pair of upwardly depending sidewalls 132 which define a channel (FIG. 7). These sidewalls 132 pass on either side of foot 80 such that foot 80 is embracingly maintained within the channel defined thereby (FIGS. 7 and 14). Each channel sidewall 132 includes apertures therein which align with the vertical slots 87 in the sidewalls 83 of each foot 80. Preferably, the apertures in one of the channel sidewalls 132 are threaded, such that a bolt 133 can be passed through the aperture in the other channel sidewall, through the slots 87 in the two sidewalls 83 of feet 80, and threaded into the apertures in the opposite channel sidewall 132. Both 133 can then be loosened while leveler glide 88 is adjusted to the proper height, thereby allowing stabilizer 130 to slide or be readily moved vertically with respect to foot 80. Once the proper height is reached, bolts 133 can be tightened down, to thereby insure stabilization of the partition at the proper height.

Because the partitions 1 are joined in such a way that they pivot on an axis which is generally at the inside corner of adjacent partitions (FIG. 10) the ends 21 of the partitions are generally exposed when the panels are adjusted at an angle. If wiring is passed between adjacent panels cocked at such an angle, the wiring would be completely visible. To eliminate this, a corner cover 140 is provided which comprises a smaller member 141 which telescopically interfits with a larger member 142 (FIG. 18). Each of the two members comprises a generally curved wall 143 joined to a top wall 144 which is shaped generally like a segment of a circle. Projecting from each sidewall 143 is a connecting flange 145 which can be bolted to foot 80 in place of end cover 110 by means of bolts 114. Because the smaller and larger members are telescopically interfitting, the adjacent partitions can be rotated to any number of angles, and the wiring will still be covered.

To facilitate joining different height partitions in a variety of ways, a plurality of special joining brackets 150, 160 and 170 are provided (FIGS. 19, 20 and 21). Joining bracket 150 comprises a first leg 151 with hook tabs 152 extending therefrom such that first leg 151 can be inserted into a channel 28 (FIG. 5) and hooked into receiving slots 23 to thereby secure joining bracket 150 to a partition. Second leg 153 projects from first leg 151 generally at right angles thereto and includes a tab 154 at the top thereof, bent over in the same general direction that first leg 151 projects. Tab 154 can be bolted by a bolt 74 through aperture 154a and into the same nut 25 at the top of end member 21 in the same manner that a link 70 would be secured thereto. With bracket 150, adjacent partitions of different sizes can be either directly aligned or cocked at a slight angle as shown in FIG. 19.

Right angle bracket 160 facilitates joining a shorter partition to a taller partition at a right angle. It is comparable in structure to bracket 150, having a first leg 161 with hook tabs 162 thereon. This facilitates securing bracket 160 in channel 28. A second leg 163 extends from first leg 161 generally at a right angle and has a tab 164 bent over at the top thereof in a direction generally away from first leg 161. Tab 164 is secured to a partition 1 by a bolt 74 passing through aperture 164a therein and into nut 25 in the same manner that a link 70 would be secured thereto.

Midway bracket 170 makes it possible to join a taller partition to a shorter partition midway between the ends thereof, without having to rely on the nuts 25 disposed at the ends of the partition. Midway bracket 170 includes a first leg 171 having hook tabs 172 thereon for mounting in channel 28. It also includes a second leg 173 disposed generally at a right angle thereto. However, a third leg 174 is provided extending generally at a right angle to the second leg 173 in generally the same direction as first leg 171. Third leg 174 includes a flange 175 bent over at the top thereof having an aperture 175a in the end thereof whereby it can be bolted into the top of top frame element 114. Flange 175 includes an upward deviation 176 therein to insure clearance over the top edge of a panel 30 secured to frame 10.

Finally, to facilitate the joining of a partition 1 to a cabinet 4 or the like in the manner shown in FIG. 1, a special wing bolt 180a or 180b is provided. Wing bolt 180a includes a sheet metal screw portion 181 with a wing 182 at the end thereof. Sheet metal screw portion 181 can be threaded into the side of a cabinet 4 and wing 182 can be secured to the end of a partition 1 by means of aperture 183 therein. A bolt 74 is passed through aperture 183 and into a receiving nut 25 in the same manner as a link 70 would be secured to the end of partition 1. Wing bolt 180b is identical, except that its threaded portion 181 is adapted to be threaded into a receiving nut secured at some point to an adjacent cabinet 4.

OPERATION

In operation, a single frame 10 may be used to provide a plurality of different styled partitions, merely by interchanging different styles of panels 30. A panel 30 is slid into the bottom channel defined by ledge 16 and lip 17 (FIG. 7) and is hooked over crosspiece 18 by means of hooks 35. Securance at the top is achieved by slipping the legs of clips 36 over the top of top frame member 14 into the openings in the ends of the rigidifying channels 32. Cover 40 is snapped onto top piece 14 and its overhanging lip 42 masks the top edge of each panel 30 on either side of frame 10. The side edges of a panel 30 are masked by securing a cover 60 in position over each wiring channel 50 (FIGS. 4 and 5). Cover 60 simultaneously covers any wires which may be lying within wiring channel 50. To insure that the surface of any particular panel 30 is generally flush with the lateral extremities of the end trim pieces 21, the thickness of the reinforcing ribs 32 is inversely proportional to the thickness of the face 31 which makes up a particular panel 30.

The base wiring area between feet 80 at the bottom of a partition 1 is covered by snapping moldings 120 into position. The slots in the bottom edge 123 of each molding 120 are fitted over the downwardly resiliently flexible tabs 89a and the top edges 122 of each molding 120 are snapped into position beneath ledge 16 (FIG. 7). The ends of the base wiring area are covered by end caps 110 which are bolted to feet 80 in the manner shown in FIG. 14.

If it is desired to pass permanent or casual wiring through the base wiring area, the knockout portions 118 are knocked out of end cover members 110. A bottom platform 100 is secured to the bottom wall 82 of each foot 80 such that no wiring hangs down below the bottom edge of molding 120. If casual wiring and permanent wiring are both to be passed through the base wiring area, a top platform 90 is secured to the top wall 81 of each foot 80. Because top wall 81 is spaced slightly below bottom frame element 15, a top wiring channel is formed between top platform 90 and bottom frame element 15.

Figure 16:
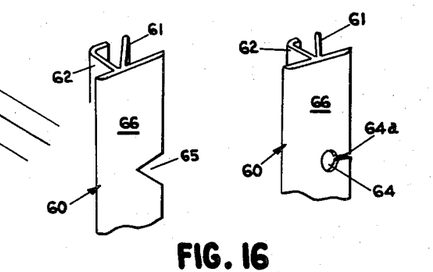
FIG. 16 is a perspective view of two vertical wiring channel covers with portions thereof notched to facilitate passage of wire therethrough.

Vertical wiring is effected by passing a wire up through wiring channel 50. If it is desired to bring a wire out of vertical wiring channel 50 at desk top level (FIG. 1), a notch or the like can be cut in the edge of the face 66 of cover 60 (FIG. 16). Wire can be passed directly through such a notch or slot onto the work surface 3 or the like.

Partitions can be joined together in endwise relationship by securing a pair of links 70 across the top ends of adjacent partitions and another pair of links 70 across the bottom ends of adjacent partitions. Specifically, the links 70 at the top of the partition are bolted into receiving nuts 25 in the end trim members 21 (FIG. 8). The downwardly projecting pin 73 on the rigidifying leg 72 fits into the innermost receiving slot 26 in the top member 14 of each partition. If the panel partitions are to be cocked at an angle with respect to one another, one of the links 70 is removed (or left in its stored position). The partition which is secured to the joining leg 71 only of the remaining link 70 is rotated to the desired angle. For orientation at an angle greater than 45 degrees with respect to straight alignment, the link 70 can be detached and reoriented with its pin 73 positioned in the endmost receiving slot 26 (FIG. 12).

The only exception to the above description is that each bottom link 70 is secured to adjacent partitions by one bolt and by one downwardly depending pin 25a (FIG. 13). After loosening bolts 114 (FIG. 14), the top member 115 of end cover 110 is slid downwardly onto bottom member 111 to facilitate working with these bottom links. After joining is effected, top member 115 is slid up again and bolts 114 tightened.

Where partitions are to be cocked at an angle, and where wiring is to be passed between the partitions, end covers 110 are replaced by a corner cover 140 (FIG. 18). The telescopically interfitting members 141 and 142 of corner cap 140 allow the panels to be adjusted angularly while still covering any wiring passing therebetween.

In order to support a plurality of partitions joined in a straight line, or a single partition in a freestanding fashion, stabilizer 130 can be secured to foot 80 with its channel walls 132 embracing the same (FIGS. 7 and 14). Leveler glide 88 is turned to adjust the height of the partition while the bolts 133 are maintained loose. Thus, the bolts 133 are free to slide in vertical slots 87. Once proper height is achieved, bolts 133 are tightened down and the height of stabilizer 130 with respect to foot 80 becomes fixed. Through the use of joining brackets 150, 160 and 170 in the manner as described above, low and high partitions can be joined in the variety of ways shown in FIGS. 19, 20 and 21. To facilitate joining a partition to a cabinet 4 in the manner shown in FIG. 1, wing bolt 180a or 180b can be utilized in the manner described above.

CONCLUSION

Thus, the present invention provides a partition system which is extremely versatile and which maximizes economics of construction. A variety of different style partitions can be obtained by using the same skeletal frame in conjunction with a variety of different types of panels. The need for using a second covering on top of a partition which has permanent panels affixed thereto is eliminated.

A link structure is employed in the present invention which simplifies the joining of adjacent partitions together and yet which maximizes rigidity therebetween. The same link system is used whether the partitions are joined in direct alignment, or at an angle with respect to one another.

Flexibility in vertical wiring is achieved in that wiring can be brought up through channel 50 and brought out through a slot or notch in channel cover 60 at any desired level. One merely selects the level desired and cuts an appropriate slot or notch.

Versatility and economics are achieved in the base wiring area by providing feet to which spaced top and bottom platforms can be secured. This makes it possible to divide a wiring area into two separate sections, one for casual wiring and one for service wiring. This entire base wiring area is covered by a readily detachable, ingenious molding which snaps into place by resting on resiliently downwardly flexible tabs at the very base of the partition. The end covers provided for the ends of the base wiring area can be used with or without wiring and are telescopically constructed to provide access when desired to the means whereby adjacent partitions are joined at their bottoms. Where the adjacent partitions are to be cocked at an angle with service lines passing therebetween, a telescoping corner cover can be utilized to thereby allow angular adjustment without exposing the wiring.

The stabilizer structure for use in conjunction with the partitions is greatly simplified by eliminating any leveler glides therein and simply providing a channel which matingly embraces the feet of the partition in a slidable relationship. The leveler glide on the partition is then adjusted and when proper height is achieved, the stabilizer is made secure with respect to the foot. Finally, where odd sized partitions are to be joined in odd ways, unique joining brackets are provided to facilitate these junctures.

Of course, it is understood that the above is merely a preferred embodiment of the invention and that many changes and alterations can be made thereof without departing from the spirit and broader aspects of the invention.

We claim:

1. A partition comprising: a frame including a vertical end element at each end thereof and a horizontal element extending between said vertical elements generally at the bottom thereof; a foot at each end of said frame, said foot having a top wall, sidewalls, a bottom wall and being open through its center in a direction generally parallel to the plane of the partition; said vertical end element extending below the level of said horizontal element and being secured to said top wall of said foot; said top wall of each said foot including means for securing a first platform thereto to define a wiring channel between said first platform and said horizontal member; said bottom wall of each of said feet including means for securing a second platform thereto for defining a second wiring channel between said first and second platforms and through said openings in said feet.

2. The partition of claim 1 in which: an end cap is secured to each of said feet at the outside end thereof to thereby cover the ends of said channels; said end cap including a knockout portion which can be removed in the event that it is desirable to pass wiring or the like through said end cap and into said wiring channels.

3. The partition of claim 2 in which: said partition includes panel means extending upwardly generally from said horizontal element; joining means at the bottom ends of said panel means for joining adjacent partitions together; said end cap including first and second telescopically interfitting members; said first member being positioned adjacent the bottom of said panel means and being slidable downward onto said second member to allow access to said partition joining means; both said first and second members of said end cap including overlapping knockout portions.

4. The partition of claim 1 including panel means extending upwardly generally from said horizontal element; a molding for covering each side of said wiring channels; a tab projecting outwardly from each side of each of said feet and being resiliently flexible downwardly; said molding including a top edge abutting the underside of said panel means and a bottom edge including recesses therein which matingly engage said tab.

5. A partition comprising: panel means; a base below said panel means; means at said base of said partition for joining adjacent partitions together; a telescoping end cap secured to the ends of said partition for covering said base; said end cap including first and second telescopically interfitting members; said first member being slidable with respect to said second member to allow access to said partition joining means.

6. The partition of claim 5 said base includes a wiring channel therein extending from one end thereof to the other and in which each of said first and second telescopically interfitting members includes a knockout portion whereby said portion can be removed to facilitate passing wiring to said base.

7. The partition of claim 5 including panel means extending upwardly generally from said horizontal element; a molding for covering each side of said wiring channels; a tab projecting outwardly from each side of each of said feet and being resiliently flexible downwardly; said molding including a top edge abutting the underside of said panel means and a bottom edge including recesses therein which matingly engage said tab.

8. The partition of claim 5 in which: each of said first and second telescopically interfitting members comprises a front wall joined to spaced sidewalls; the sidewalls of said first member extending a shorter distance from their said front face than the sidewalls of said second member extend from their front face; said sidewalls of said second member being bolted to said base ends, the heads of said bolts overlapping said sidewalls of said first member.

9. A partition comprising: panel means; a wiring channel extending across the bottom of said panel means from one end thereof to the other; means at the end and bottom of said panel means for joining adjacent partitions together; said means for joining adjacent partitions together comprising means for pivotally joining adjacent channels about an axis generally at the inside corner edges of said partitions, thereby leaving the ends of said partitions generally visible; a telescoping corner cap including a first member having means for securing to the bottom, generally outside edge of one partition at the end of said wiring channel and a second member having means for securing to the bottom, generally outside edge of the other partition at the end of its said wiring channel; each of said first and second corner cap members including a curved sidewall and a top wall which is shaped generally like a segment of a circle; said first and second members telescopically interfitting whereby the angle between adjacent partitions can be varied.

10. A partition comprising: panel means; feet depending below said panel means and defining an open area at the base of said panel means; a molding for covering each side of said open area; a tab projecting outwardly from each side of each said foot and being resiliently flexible downwardly; said molding including a top edge abutting the underside of said panel means and a bottom edge including recesses therein which matingly engage said tabs.

11. The partition of claim 10 in which each said molding comprises a piece of sheet metal bent inwardly at its top to define said top edge and then inwardly and upwardly at its bottom to define said bottom edge; said recesses comprising slotted apertures in said bottom edge.

* * * * *